(12) United States Patent
Reddy et al.

(10) Patent No.: US 9,890,317 B2
(45) Date of Patent: Feb. 13, 2018

(54) SOLIDS-FREE DIVERTING AGENTS AND METHODS RELATED THERETO

(71) Applicant: Halliburton Energy Services, Inc., Houston, TX (US)

(72) Inventors: B. Raghava Reddy, The Woodlands, TX (US); Feng Liang, Cypress, TX (US)

(73) Assignee: Hallburton Energy Services, Inc., Houston, TX (US)

(*) Notice: Subject to any disclaimer, the term of this patent is extended or adjusted under 35 U.S.C. 154(b) by 43 days.

(21) Appl. No.: 14/906,927

(22) PCT Filed: Oct. 22, 2013

(86) PCT No.: PCT/US2013/066006
§ 371 (c)(1),
(2) Date: Jan. 22, 2016

(87) PCT Pub. No.: WO2015/060813
PCT Pub. Date: Apr. 30, 2015

(65) Prior Publication Data
US 2016/0160108 A1    Jun. 9, 2016

(51) Int. Cl.
*E21B 33/138* (2006.01)
*E21B 43/16* (2006.01)
(Continued)

(52) U.S. Cl.
CPC ............ *C09K 8/12* (2013.01); *C09K 8/035* (2013.01); *C09K 8/42* (2013.01); *C09K 8/508* (2013.01);
(Continued)

(58) Field of Classification Search
CPC ........ E21B 43/16; E21B 33/138; C09K 8/516
See application file for complete search history.

(56) References Cited

U.S. PATENT DOCUMENTS

| | | |
|---|---|---|
| 4,157,116 A | 6/1979 | Coulter |
| 6,364,016 B1 | 4/2002 | Dalrymple et al. |

(Continued)

FOREIGN PATENT DOCUMENTS

WO    2015060813 A1    4/2015

OTHER PUBLICATIONS

International Search Report and Written Opinion for PCT/US2013/066006 dated Jul. 25, 2014.

*Primary Examiner* — Catherine Loikith
(74) *Attorney, Agent, or Firm* — McDermott Will & Emery LLP

(57) ABSTRACT

Diverting fluids may include a solids-free diverting agent having a non-dissolved suspended solids content of less than about 0.01% by weight of the solids-free diverting agent and comprising degradable polyesters dissolved in a water-miscible solvent. Method of utilizing such diverting fluids in subterranean operations may include providing a subterranean formation that comprises a first portion and a second portion, wherein the first portion has a higher permeability than the second portion; introducing the diverting fluid into the first portion; precipitating the degradable polyester in the diverting fluid by contacting at least a portion of the diverting fluid in the first portion with an aqueous fluid to form a precipitated degradable polyester, thereby reducing fluid flow into the first portion; diverting at least a portion of a treatment fluid to the second portion; and treating at least a portion of the second portion with the treatment fluid.

13 Claims, 1 Drawing Sheet

(51) Int. Cl.

| | |
|---|---|
| *C09K 8/516* | (2006.01) |
| *C09K 8/12* | (2006.01) |
| *C09K 8/035* | (2006.01) |
| *C09K 8/508* | (2006.01) |
| *C09K 8/76* | (2006.01) |
| *C09K 8/42* | (2006.01) |
| *C09K 8/72* | (2006.01) |
| C09K 8/528 | (2006.01) |

(52) U.S. Cl.
CPC .............. *C09K 8/516* (2013.01); *C09K 8/725* (2013.01); *C09K 8/76* (2013.01); *E21B 43/16* (2013.01); *C09K 8/528* (2013.01); *C09K 2208/12* (2013.01); *C09K 2208/26* (2013.01)

(56) References Cited

U.S. PATENT DOCUMENTS

| | | |
|---|---|---|
| 7,036,587 B2 | 5/2006 | Munoz, Jr. et al. |
| 7,182,136 B2 | 2/2007 | Dalrymple et al. |
| 7,775,278 B2 | 8/2010 | Willberg et al. |
| 8,109,335 B2 | 2/2012 | Luo et al. |
| 8,278,250 B2 | 10/2012 | Dalrymple et al. |
| 2006/0169450 A1 | 8/2006 | Mang et al. |
| 2006/0172894 A1 | 8/2006 | Mang et al. |
| 2008/0070810 A1* | 3/2008 | Mang ................ C04B 28/02 507/219 |
| 2012/0285695 A1* | 11/2012 | Lafferty ............. C09K 8/03 166/310 |

* cited by examiner

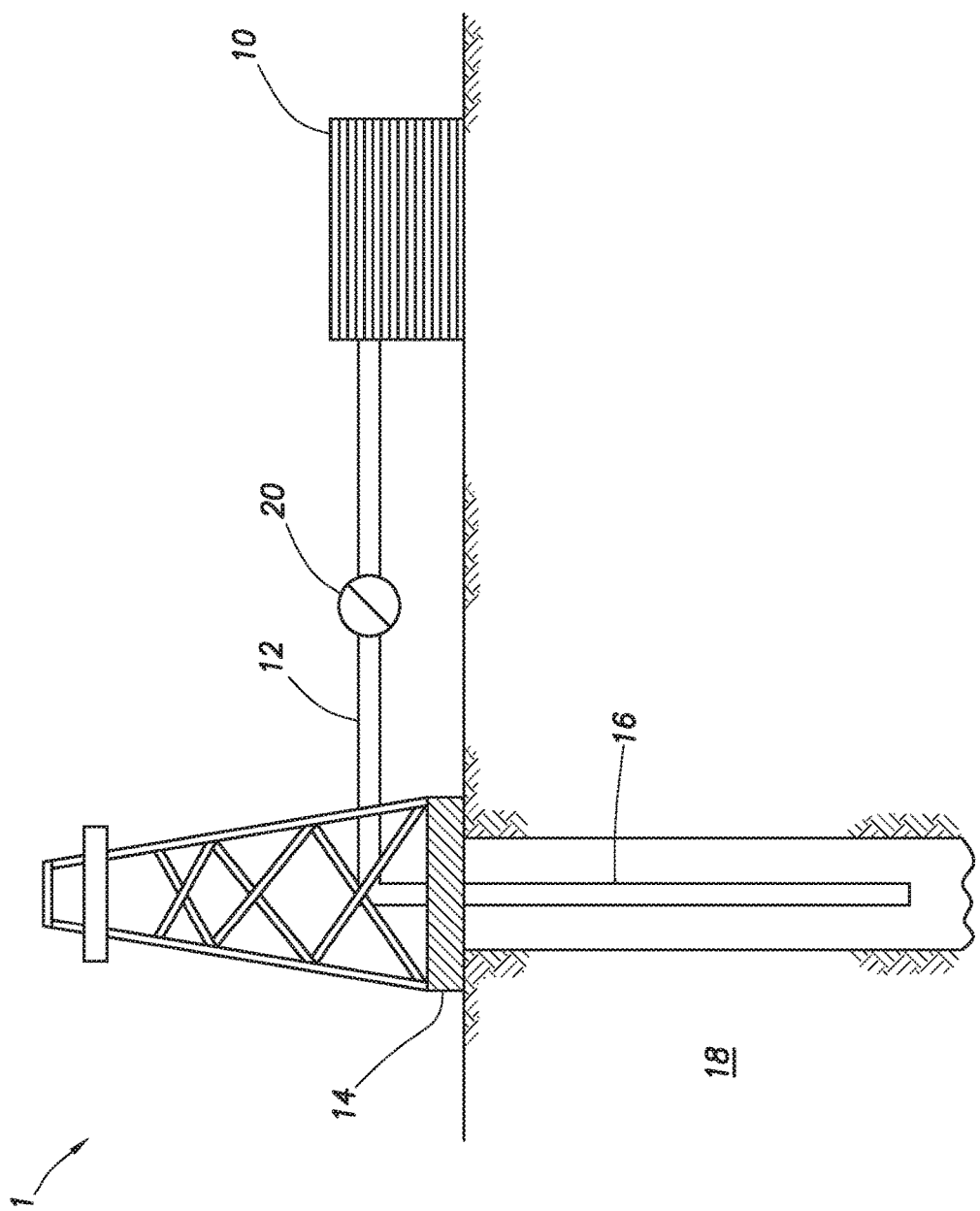

SOLIDS-FREE DIVERTING AGENTS AND METHODS RELATED THERETO

BACKGROUND

The exemplary embodiments described herein relate to diverting fluids that include a solids-free diverting agent that comprises degradable polyesters, and methods relating thereto.

Diverting agents may be used in a variety of subterranean treatments (e.g., drilling, stimulation treatments (e.g., fracturing treatments, matrix acidizing treatments), and cementing operations). For example, a producing portion of the subterranean formation can be stimulated by introducing an aqueous acid solution into the surrounding formation matrix to dissolve formation material or materials near the wellbore, thereby increasing its porosity and permeability and enhancing hydrocarbon production from that portion. To treat the producing portion effectively, a diverting agent is often placed in the more permeable portions to mitigate fluid flow into those portions and direct the placement of the desired treatment fluid into the producing portion.

Traditional diverting agents may be grouped into two general classifications: viscous-fluid diverting agents and mechanical diverting agents. In the former, typically, a relatively high viscosity fluid flows into a subterranean portion, creating a resistance that causes subsequent treatment fluids to be diverted to other portions of the formation. The viscous-fluid diversion methods are considered relatively easy to implement, but are generally thought not to be as effective as diverting agents that introduce a mechanical barrier. Additionally, high temperatures associated with greater depth in the subterranean formation can lead to increased instability of such viscosified fluids.

Mechanical diverting agents, which work by forming a physical barrier to flow, include particulate diverters. Particulate diverting agents often are suspended in a carrier fluid, often to a point of saturation to be pumped downhole. This carrier fluid is oftentimes introduced to the subterranean formation during a stimulation treatment. Traditional examples of particulate diverting agents are inorganic materials (such as rock salts) and polymeric materials. These particulate materials typically form a seal in the subterranean formation (e.g., by packing off perforation tunnels, plating off against a formation surface, plating off a hole behind a slotted liner, or packing along the surface of a hydraulic fracture), causing a subsequent treatment fluid to be diverted to other portions of the formation.

Because particulate diverting agents are suspended in a carrier fluid, the particulates tend to settle or segregate in the fluid, especially when the flow rate of the carrier fluid is reduced (e.g., as it penetrates into fractures and perforation in the subterranean formation). As a result, particulate diverting agents oftentimes are deposited primarily in near-wellbore portions of the subterranean formation. Further, because the diverting agents are particulates, their efficacy is limited by their size, especially in shale zones. That is, portions of the formation matrix with pore sizes smaller than the particle size cannot be penetrated though with the particulate diverting agents. These drawbacks can reduce the efficiency of the diverting fluids.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 shows an illustrative schematic of a system that can deliver treatment fluids of the present disclosure to a downhole location, according to one or more embodiments.

DETAILED DESCRIPTION

The exemplary embodiments described herein relate to diverting fluids that include a solids-free diverting agent that comprises degradable polyesters, and methods relating thereto.

As used herein, the term "solids-free" refers to a solution having a non-dissolved suspended solids content of less than about 0.01% by weight of the solution. Determining the amount of non-dissolved suspended solids may be achieved by filtering the solution through a 45 micron filter, drying the non-filtrate, and calculating the non-dissolved suspended solids as (mass dried non-filtrate)/(mass solution before filtration)*100.

In some embodiments, the diverting fluids described herein may comprise a solids-free diverting agent having a non-dissolved suspended solids content of less than about 0.01% by weight of the solids-free diverting agent and comprising a degradable polyester dissolved in a water-miscible solvent. Contacting the diverting fluid with an aqueous fluid may, in some instances, precipitate the degradable polyester dissolved in water-miscible solvent, so as to form a precipitated degradable polyester that may be in the form of (or comprise) a plurality of precipitated degradable polyester particles, a precipitated degradable polyester gel, or a hybrid thereof. When precipitated in a permeable portion of the subterranean formation, the precipitated degradable polyester may divert fluid flow in the permeable portion of the subterranean formation. In some instances, the precipitated degradable polyester may then be at least partially degraded so as to return at least some fluid flow into or out of the permeable portion the subterranean formation (e.g., increasing the permeability relative to the permeability with the precipitated degradable polyester therein).

The solids-free diverting agents described herein may advantageously be able to penetrate deeper into permeable portions of the subterranean formation as compared to traditional mechanical diverting agents.

Deeper penetration into a permeable portion in the formation increases the size of the barrier or seal that reduces fluid flow into the permeable portion, which, in turn, increase the lifetime of the barrier or seal and decreases the frequency with which diverting operations need to be performed.

Further, because the solids-free diverting agents described herein utilize in situ precipitation for diverting/plugging, the solids-free diverting agents may be able to permeate small pore sizes then precipitate therein to produce a mechanical diverter that reduce flow therethrough. This allows for diverting operations to be performed on portions of the subterranean formation that traditional particulate diverting agents may not be able to treat.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques. Further, when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some instances, the diverting fluids described herein may comprise a solids-free diverting agent and less than about 0.05% water by weight of the diverting fluid, or more preferably less than about 0.01% water by weight of the diverting fluid. The solids-free diverting agent may be included in the diverting fluid in an amount ranging from a lower limit of about 1%, 5%, 10%, 25%, or 50% of the total volume diverting fluid to an upper limit of about 100%, 90%, 80%, or 70% by weight of the diverting fluid, and wherein the amount of solids-free diverting agent may range from any lower limit to any upper limit and encompasses any subset therebetween. When the solids-free diverting agent is less than 100% of the diverting fluid, the remainder of the diverting fluid may comprise, for example, at least one of particulate diverting agents, additives, a water-miscible solvent and the like, and any combination thereof. Each is discussed in more detail herein. One of ordinary skill in the art should recognize that additional fluids like carrier fluids that cause precipitation of the degradable polyester should not be included in the diverting fluid in an amount that causes precipitation prior to placement of the diverting fluid in the desired location.

The solids-free diverting agents described herein may comprise a degradable polyester dissolved in a water-miscible solvent.

Suitable degradable polyester may include, but are not limited to, poly(lactide), poly(glycolide), poly(e-caprolactone), poly(hydroxybutyrate), an aliphatic polyester, a poly (orthoester), any copolymer thereof, and any combination thereof. Degradable polyesters may be included in the solids-free diverting agents in an amount ranging from a lower limit of about 1%, 5%, or 10% by weight of the solids-free diverting agent to an upper limit of saturation or about 50%, 40%, 30%, or 20% by weight of the solids-free diverting agent, and wherein the amount of degradable polyester may range from any lower limit to any upper limit and encompasses any subset therebetween.

As used herein, the term "water-miscible solvent" refers to a non-aqueous fluid that mixes by dissolution in some proportion with water at ambient or formation temperatures without the use of chemical additives (for example, compatibilizing solvents such as mutual solvents such as alcohol ethers and the like). Water-miscible solvents for use in the solids-free diverting agent should dissolve the degradable polyester as compared to suspending particles of degradable polyester. Examples of such water-miscible solvents may include, but are not limited to, acetic acid, formic acid, ethyl acetate, a ketone, an alcohol, glycol, glycerol, alcohol ethers, tetrahydrofuran, dioxane and any combination thereof. In an embodiment, the water-miscible solvents suitable for use have a solubility of 5% in water at ambient or formation temperatures.

In some embodiments, the diverting fluids described herein may comprise a solids-free diverting agent and a particulate diverting agent. The use of a particulate diverting agent in combination with a solids-free diverting agent may synergistically enhance the efficacy of a diverting operation. For example, the particulate diverting agent may be sized to effectively incorporate into larger fractures and pores while the solids-free diverting agent may incorporate into smaller pores and in the interstitial spaces between the particulate diverting agents. Then, the precipitated degradable polyester formed from the solids-free diverting agent may reduce fluid flow through the smaller pores and interstitial spaces between the particulate diverting agents.

Suitable particulate diverting agents include particulates that do not dissolve in the water-miscible solvent. Examples of particulate diverting agents may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The mean particulate size generally may range from about 2 mesh to about 400 mesh on the U.S. Sieve Series; however, in certain circumstances, other mean particulate sizes may be desired and will be entirely suitable for practice of the embodiments of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and combinations thereof.

Particulate diverting agents may be included in the diverting fluids in an amount ranging from a lower limit of about 0.1%, 1%, or 5% by weight of the diverting fluid to an upper limit of about 30%, 20%, or 10% by weight of the diverting fluid, and wherein the amount of the particulate diverting agent may range from any lower limit to any upper limit and encompasses any subset therebetween.

In some embodiments, the diverting fluids described herein may comprise a solids-free diverting agent and at least one additive. Examples of additives may include, but are not limited to, salts, emulsifiers, dispersion aids, corrosion inhibitors, viscosifying agents, gelling agents, surfactants, foaming agents, gases, breakers, biocides, stabilizers, chelating agents, scale inhibitors, gas hydrate inhibitors, mutual solvents, oxidizers, reducers, friction reducers, clay stabilizing agents, and the like, and any combination thereof.

As described above, contacting the diverting fluid with an aqueous fluid may precipitate the degradable polyester dissolved in water-miscible solvent, thereby forming a precipitated degradable polyester. Suitable aqueous fluids may comprise water and optionally include at least one of acids, salts, and water-miscible solvents.

In some instances, the aqueous fluid may be a fluid introduced into the wellbore after introduction of the diverting fluid. For example, a treatment operation may, in some embodiments, involve introducing a diverting fluid described herein into a first portion of the subterranean formation; introducing a flush fluid comprising an aqueous fluid into the subterranean formation where a portion of the flush fluid contacts the diverting fluid and precipitates the degradable polyester dissolved in water-miscible solvent, thereby forming a precipitated degradable polyester in the first portion; introducing a treatment fluid into the subterranean formation; diverting at least a portion of the treatment fluid from the first portion to a second portion of the subterranean formation; and treating the second portion with the treatment fluid.

In some instances, the aqueous fluid may cause the treatment fluid to be diverted. For example, an acidizing operation may, in some embodiments, involve introducing a diverting fluid described herein into a first portion of a subterranean formation; introducing an acidizing fluid (for example, a diluted mineral acid) into the subterranean formation where a first portion of the acidizing fluid contacts the diverting fluid and precipitates the degradable polyester dissolved in water-miscible solvent, thereby forming a precipitated degradable polyester in the first portion; diverting a second portion of the acidizing fluid to a second portion of the subterranean formation; and acidizing the second portion.

In some instances, the aqueous fluid may be a formation fluid. For example, a treatment operation may, in some embodiments, involve introducing a diverting fluid described herein into a first portion of a subterranean formation, wherein the first portion contains an aqueous formation fluid; precipitating the degradable polyester dissolved in water-miscible solvent with the aqueous formation fluid, thereby forming a precipitated degradable polyester in the first portion; introducing a treatment fluid into the subterranean formation; diverting at least a portion of the treatment fluid from the first portion to a second portion of the subterranean formation; and treating the second portion with the treatment fluid.

In some instances a combination of two or more of the foregoing methods may be performed. For example, the first portion may comprise an aqueous formation fluid, and a flush fluid may also be used, such that both the aqueous formation fluid and the flush fluid participate in forming a precipitated degradable polyester.

In some instances, a flush fluid comprising less than about 0.05% water may be introduced after the diverting fluid described herein before substantial precipitation of the precipitated degradable polyester. Such a flush fluid may advantageously clear diverting fluid from the wellbore so as to minimize the risk of forming precipitated degradable polyester in the wellbore.

The treatment fluid introduced subsequent to the diverting fluid described herein may comprise at least one of an acid, a scale inhibitor or a clay stabilizing agent, a shale stabilizing agent, a viscosifier, a permeability modifier, one or more salts, and any combination thereof. Examples of acids may include, but are not limited to, hydrochloric acid, hydrofluoric acid, acetic acid, formic acid, citric acid, lactic acid, glycolic acid, sulfamic acid, tartaric acid, methanesulfonic acid, trichloroacetic acid, dichloroacetic acid, chloroacetic acid, fluoroboric acid, fluorophosphoric acid, hexafluorotitanic acid, fluorophosphoric acid, phosphoric acid, and any combination thereof. Examples of scale inhibitors may include, but are not limited to, tetrasodium ethylenediamine acetate, pentamethylene phosphonate, hexamethylenediamine phosphonate, polyacrylate, and any combination thereof. Examples of shale stabilizing agents may include, but are not limited to, long chain alcohols, polyols, amine inhibitors, sodium or potassium silicates, partially hydrolyzed polyacrylamides, polyalkene glycols, anionic surfactants, salt solutions containing, for example, sodium chloride, potassium chloride, or ammonium chloride; cationic polymers and oligomers, for example, poly(dimethyldiallylammonium chloride), cationic poly(acrylamide), cationic poly(diemethylaminoethylmethacrylate), and any combination thereof. Examples of viscosifiers may include, but are not limited to, mineral viscosifiers (e.g., bentonite and the like), polymeric viscosifiers, crosslinked polymeric viscosifiers, crosslinkable polymeric viscosifiers, viscoelastic surfactants, and the like. Examples of permeability modifiers may include, but are not limited to, a hydrophobically modified hydrophilic polymer. Hydrophobically modified hydrophilic polymers vary widely in structure, but generally comprise a hydrophilic polymer that has been at least partially chemically modified with hydrophobic groups (e.g., long chain alkyl groups having more than about 4 carbon atoms in some embodiments or more than about 6 carbons in other embodiments). Hydrophilic polymers may include homopolymer, copolymers, terpolymers, and the like with monomeric units that include, for example, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, di methylam inopropyl methacrylate, dimethylaminopropyl methacrylamide, trimethylammoniumethyl methacrylate halide (halide=chloride, bromide, iodide or a halide equivalent such as, for example, a tosylate or methanesulfonate), acrylamide, methacrylamide, and hydroxyethyl acrylate. In some instances, other monomeric units may be included in the copolymers and terpolymers.

In some instances, after diverting, the precipitated degradable polyester may be at least partially degraded so as to return at least some of the fluid flow to the corresponding portion in the formation. In some instances, degrading may involve contacting the precipitated degradable polyester with a breaker fluid. Breaker fluids may comprise at least one of an inorganic base, an amine, an amino alcohol, and any combination thereof.

Some embodiments described herein may further involve producing hydrocarbons form the subterranean formation (e.g., from the portion stimulated with an acidizing fluid).

In some instances, the methods described herein may be performed on the subterranean formation or a portion thereof. For example, a portion of the subterranean formation may be isolated mechanically with one or more packers in the wellbore. Then, in some instances, the methods described herein may be performed on the isolated portion of the subterranean formation.

In various embodiments, systems configured for delivering the diverting fluids described herein to a downhole location are described. In various embodiments, the systems can comprise a pump fluidly coupled to a tubular, the tubular containing a diverting fluid that comprises a solids-free diverting agent having a non-dissolved suspended solids content of less than about 0.01% by weight of the solids-free diverting agent and comprising a degradable polyester dissolved in a water-miscible solvent (or, in some instances, other diverting fluids described herein).

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the diverting fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the diverting fluid to the high pressure pump. In such embodiments, the low pressure pump may "step up" the pressure of the diverting fluid before it reaches the high pressure pump.

In some embodiments, the systems described herein can further comprise a mixing tank that is upstream of the pump and in which the diverting fluid is formulated. In various embodiments, the pump (e.g., a low pressure pump, a high pressure pump, or a combination thereof) may convey the diverting fluid from the mixing tank or other source of the diverting fluid to the tubular. In other embodiments, however, the diverting fluid can be formulated offsite and transported to a worksite, in which case the diverting fluid may be introduced to the tubular via the pump directly from its shipping container (e.g., a truck, a railcar, a barge, or the like) or from a transport pipeline. In either case, the diverting fluid may be drawn into the pump, elevated to an appropriate pressure, and then introduced into the tubular for delivery downhole.

FIG. 1 shows an illustrative schematic of a system that can deliver diverting fluids of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a diverting fluid of the present invention may be formulated. The diverting fluid may be conveyed via line 12 to wellhead 14, where the diverting fluid enters tubular 16, tubular 16 extending from wellhead 14 into subterranean formation 18. Upon being ejected from tubular 16, the diverting fluid may subsequently penetrate into subterranean formation 18. Pump 20 may be configured to raise the pressure of the diverting fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the diverting fluid may, in some embodiments, flow back to wellhead 14 and exit subterranean formation 18. In some embodiments, the diverting fluid that has flowed back to wellhead 14 may subsequently be recovered and recirculated to subterranean formation 18.

It is also to be recognized that the disclosed diverting fluids may also directly or indirectly affect the various downhole equipment and tools that may come into contact with the diverting fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes providing a subterranean formation that comprises a first portion and a second portion, wherein the first portion has a higher permeability than the second portion; introducing a diverting fluid into the first portion, the diverting fluid comprising a solids-free diverting agent that comprises a degradable polyester dissolved in a water-miscible solvent, wherein the solids-free diverting agent has a non-dissolved suspended solids content of less than about 0.01% by weight of the solids-free diverting agent; precipitating the degradable polyester in the diverting fluid by contacting at least a portion of the diverting fluid in the first portion with an aqueous fluid to form a precipitated degradable polyester, thereby reducing fluid flow into the first portion with the precipitated degradable polyester; diverting at least a portion of a treatment fluid to the second portion; and treating at least a portion of the second portion with the treatment fluid.

B. a method that includes providing a subterranean formation that comprises a first portion and a second portion, wherein the first portion has a higher permeability than the second portion; introducing a diverting fluid into the first portion, the diverting fluid comprising a solids-free diverting agent that comprises a degradable polyester and a water-miscible solvent, wherein the solids-free diverting agent has a solids content of less than about 0.01% by weight of the solids-free diverting agent; precipitating the degradable polyester in the diverting fluid by contacting at least a portion of the diverting fluid in the first portion with a flush fluid that comprises water to form a precipitated degradable polyester, thereby reducing fluid flow into the first portion with the precipitated degradable polyester; introducing an acidizing fluid into the subterranean formation; diverting at least a portion of the acidizing fluid to the second portion with the precipitated degradable polyester; and acidizing at least a portion of the second portion.

C. a method that includes providing a subterranean formation that comprises the first portion and a second portion, wherein the first portion has a higher permeability than the second portion; introducing a diverting fluid into the first portion of a subterranean formation, the diverting fluid comprising a polymeric solution that comprises a degradable polyester and a water-miscible solvent, wherein the polymeric solution has a solids content of less than about 0.01% by weight of the polymeric solution; precipitating the degradable polyester in the diverting fluid by contacting at least a portion of the diverting fluid in the first portion with an acidizing fluid that comprises an acid and water to form a precipitated degradable polyester, thereby reducing fluid flow into the first portion with the precipitated degradable polyester; diverting at least a portion of the acidizing fluid to the second portion of the subterranean formation with the precipitated degradable polyester; acidizing the second portion of the subterranean formation; degrading at least a portion of the precipitated degradable polyester, thereby returning at least some of the fluid flow to the first portion; and producing hydrocarbons from the subterranean formation.

Each of embodiments A, B, and C may have one or more of the following additional elements in any combination: Element 1: wherein the diverting fluid comprises less than 0.05% water by weight of the diverting fluid; Element 2: wherein the solids-free diverting agent is present in the diverting fluid in an amount of about 1% to about 100% by total volume of the diverting fluid; Element 3: wherein the precipitated degradable polyester comprises a plurality of precipitated degradable polyester particulates; Element 4: wherein the degradable polyester comprises at least one selected from the group consisting of a poly(lactide), a poly(glycolide), a poly(e-caprolactone), a poly(hydroxybutyrate), an aliphatic polyester, a poly(orthoester), any copolymer thereof, and any combination thereof; Element 5: wherein the degradable polyester is present in the solids-free diverting agent in an amount greater than about 1% by weight of the solids-free diverting agent to saturation; Element 6: wherein the water-miscible solvent comprises at least one selected from the group consisting of acetic acid, formic acid, ethyl acetate, a ketone, an alcohol, glycol, glycerol, alcohol ethers, tetrahydrofuran, dioxane, and any combination thereof; Element 7: wherein the diverting fluid further comprises a particulate diverting agent; Element 8: wherein the diverting fluid further comprises a particulate diverting agent that is present in the diverting fluid in an amount of about 0.1% to about 30% by weight of the diverting fluid; Element 9: wherein the treatment fluid comprises at least one selected from the group consisting of an acid, a scale inhibitor or a clay stabilizing agent, a shale stabilizing agent, a viscosifier, a permeability modifier, one or more salts, and any combination thereof; Element 10: wherein the method further includes introducing a flush fluid into a wellbore penetrating the subterranean formation prior to introducing the diverting fluid, wherein the flush fluid comprises less than 0.05% water by weight of the flush fluid; Element 11: wherein the method further includes degrading at least a portion of the precipitated degradable polyester, thereby returning at least some of the fluid flow to the first portion; Element 12: Element 11 wherein degrading at least a portion of the precipitated degradable polyester involves contacting the portion of the precipitated degradable polyester with a breaker fluid; Element 13: Element 12 wherein the breaker fluid comprises at least one selected from the group consisting of an inorganic base, an amine, an amino alcohol, and any combination thereof; and Element 14: wherein the method further includes producing hydrocarbons from the subterranean formation.

By way of non-limiting example, exemplary combinations applicable to A, B, C include: Element 2 in combination with Element 5; Element 2 in combination with Element 6; Element 3 in combination with Element 5; Element 4 in combination with Element 5; Element 3 in combination with one of Elements 7-8; Element 6 in combination with one of Elements 7-8; Element 2 in combination with Elements 4-5 and optionally Element 6; Element 9 in combination with any of the foregoing; at least one of Elements 10-14 in combination with the foregoing; Element 10 in combination with Element 11 and optionally Elements 12 or 13 and optionally in further combination with Element 14; Element 1 in combination with any of the foregoing; and Element 1 in combination with Element 6.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

To facilitate a better understanding of the embodiments of the present invention, the following examples of preferred or representative embodiments are given. In no way should the following examples be read to limit, or to define, the scope of the invention.

EXAMPLES

An acetic acid solution with 40% poly(lactide) by weight was obtained from a supplier. A first sample (11.5 grams) of the acetic acid/poly(lactide) solution was contacted with water (500 ml) while stirring to form particulates (5.5 grams) with plurality of particle sizes. A second sample of the acetic acid/poly(lactide) solution was contacted while stirring with 15% hydrochloric acid to form a viscous mass.

The particle size distribution of the particulates formed by precipitation with water was determined to have a d10 of about 77 microns, d50 of 218 microns, and d90 of about 413 microns. Thermogravimetric analysis ("TGA") of the particulates formed by precipitation with water shows that the generated PLA particulates under this process show that the majority weight loss is at about 275° C. and about 325° C. Differential scanning calorimetry ("DSC") of the precipitated material has a glass transition temperature of about 30° C. and a small melting point peak at around 160° C.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a subterranean formation that comprises a first portion and a second portion, wherein the first portion has a higher permeability than the second portion;
   introducing a solids-free diverting fluid into the first portion, the solids-free diverting fluid comprising a solids-free diverting agent that comprises a degradable polyester dissolved in a water-miscible solvent, wherein the solids-free diverting agent has a non-dissolved suspended solids content of less than about 0.01% by weight of the solids-free diverting agent;
   precipitating the degradable polyester in the solids-free diverting fluid by contacting at least a portion of the solids-free diverting fluid in the first portion with an aqueous fluid to form a precipitated degradable polyester, thereby reducing fluid flow into the first portion with the precipitated degradable polyester;
   diverting at least a portion of a treatment fluid to the second portion; and
   treating at least a portion of the second portion with the treatment fluid.

2. The method of claim 1, wherein the solids-free diverting fluid comprises less than 0.05% water by weight of the solids-free diverting fluid.

3. The method of claim 1, wherein the solids-free diverting agent is present in the solids-free diverting fluid in an amount of about 1% to about 100% by total volume of the solids-free diverting fluid.

4. The method of claim 1, wherein the precipitated degradable polyester comprises a plurality of precipitated degradable polyester particulates.

5. The method of claim 1, wherein the degradable polyester comprises at least one selected from the group consisting of a poly(lactide), a poly(glycolide), a poly(e-caprolactone), a poly(hydroxybutyrate), an aliphatic polyester, a poly(orthoester), any copolymer thereof, and any combination thereof.

6. The method of claim 1, wherein the degradable polyester is present in the solids-free diverting agent in an amount greater than about 1% by weight of the solids-free diverting agent to saturation.

7. The method of claim 1, wherein the water-miscible solvent comprises at least one selected from the group consisting of acetic acid, formic acid, ethyl acetate, a ketone, an alcohol, glycol, glycerol, alcohol ethers, tetrahydrofuran, dioxane, and any combination thereof.

8. The method of claim 1, wherein the treatment fluid comprises at least one selected from the group consisting of an acid, a scale inhibitor or a clay stabilizing agent, a shale stabilizing agent, a viscosifier, a permeability modifier, one or more salts, and any combination thereof.

9. The method of claim 1 further comprising:
   introducing a flush fluid into a wellbore penetrating the subterranean formation prior to introducing the solids-free diverting fluid, wherein the flush fluid comprises less than 0.05% water by weight of the flush fluid.

10. The method of claim 1 further comprising:
    degrading at least a portion of the precipitated degradable polyester, thereby returning at least some of the fluid flow to the first portion.

11. The method of claim 10, wherein degrading at least a portion of the precipitated degradable polyester involves contacting the portion of the precipitated degradable polyester with a breaker fluid.

12. The method of claim 11, wherein the breaker fluid comprises at least one selected from the group consisting of an inorganic base, an amine, an amino alcohol, and any combination thereof.

13. The method of claim 1 further comprising:
    producing hydrocarbons from the subterranean formation.

* * * * *